United States Patent [19]
Cattin

[11] Patent Number: 5,695,534
[45] Date of Patent: Dec. 9, 1997

[54] AIR FILTRATION INSTALLATION WITH RECYCLING OF FILTERED AIR

[75] Inventor: Gabriel Cattin, Pont-de-Roide, France

[73] Assignee: Societe Cattinair, Pont-de-Roide, France

[21] Appl. No.: 571,894

[22] PCT Filed: Apr. 27, 1995

[86] PCT No.: PCT/FR95/00553

§ 371 Date: Dec. 18, 1995

§ 102(e) Date: Dec. 18, 1995

[87] PCT Pub. No.: WO95/29748

PCT Pub. Date: Nov. 9, 1995

[30] Foreign Application Priority Data

Apr. 28, 1994 [FR] France .................... 94 05404

[51] Int. Cl.[6] .................................................. B01D 35/147
[52] U.S. Cl. ..................... 55/272; 55/283; 55/338; 55/414; 55/417; 95/20; 95/26
[58] Field of Search .............. 55/272, 283, 302, 55/337, 338, 414, 417; 95/20, 26, 280

[56] References Cited

U.S. PATENT DOCUMENTS 2,964,129  12/1960  Labbe ........................................ 55/272
3,383,840   5/1968  Johnson et al. .
4,461,633   7/1984  Bodovsky ................................... 55/283
5,032,153   7/1991  Cattin .
5,120,333   6/1992  Davis ......................................... 55/338
5,405,421   4/1995  Swisher, Jr. ................................ 55/338

FOREIGN PATENT DOCUMENTS 0343061  11/1989  European Pat. Off. .
2514669   4/1983  France .
2666246   3/1992  France .
2704377   8/1978  Germany .
2831167   6/1980  Germany .

*Primary Examiner*—C. Scott Bushey
*Attorney, Agent, or Firm*—Greenblum & Bernstein, P.L.C.

[57] ABSTRACT

A filtration installation including a time delay device which, at the time of a filter sleeve cleaning operation, establishes a cycle to exhaust filtered air towards the outside atmosphere instead of recycling it. The installation also includes a device for bypassing the filtered air that includes two shutters. One of the shutters controls a recycling of the filtered air and the other shutter controls the exhaustion of the filtered air to the outside atmosphere. These shutters are actuated via a control device under the control of time delay device

17 Claims, 4 Drawing Sheets

AIR FILTRATION INSTALLATION WITH RECYCLING OF FILTERED AIR

BACKGROUND OF THE INVENTION

1. Field of the Invention

This invention concerns air filtration installations of the type including a device for recycling the filtered air.

2. Discussion of the Background Information

Recycling air inside buildings allows savings to be made because of the recovery of heat carried by the filtered air.

This type of recycling imposes a filtration quality governed by standards which, at the present time, requires a maximum limit of 0.6 mg of dust per m3 of recycled air.

This standard changes over time. For example, the upper limit soon to be reduced by a factor of three.

All filtration systems of the type described in documents DE-A-2704377 and 2831167, U.S. Pat. No. 3,383,840 can be used with recycling of the filtered air, as can the one described in document EP-A-0 343 061 filed by the Applicant.

However, the drawback of all these installations is that they cause a large amount of dust to be released during the filter sleeve cleaning operations.

It is known, through document FR-A-2 666 246 filed by the Applicant, that the dust ratio in the recycled air during filter unclogging operations can be reduced. This reduction in the dust ratio is obtained by exhausting the filtered air towards the outside atmosphere whenever this filtered air is abnormally and temporarily laden with dust.

The last of the above mentioned documents proposes a bypass device made up of a shutter housed in the air circulation shafts specifically, the shutter that is articulated about an axis located at the level of the head of a kind of T formed by the filtered air inlet shaft and two other shafts. One of the shafts recycles the filtered air and the other shaft exhausts the air towards the outside atmosphere.

SUMMARY OF THE INVENTION

This invention proposes an installation that makes it possible to better control the air exhausting phase to the atmosphere during the filter medium cleaning operation. It provides highly reliable operation that eliminates any risk of dust being accidentally exhausted into the recycled air.

This invention also proposes an installation designed to better control the air flows for recycling or exhausting to the atmosphere.

According to the invention, the installation may include a control device to control a bypass device including an adjustable time delay device used to establish a bypass cycle, and in particular:

- a time delay to establish a length of time t1, adjustable from 0 to 3 seconds, for example, and corresponding to a length of time separating an unclogging order and an unclogging operation and during which the bypass device is implemented in order to channel the filtered air towards the atmosphere;
- a time delay to establish a length of time t2 following t1, adjustable from 6 to 10 seconds, for example, and which corresponds to a length of time at the end of which the bypass device is again implemented in order to recycle the filtered air.

According to another embodiment of the invention, a device for controlling a bypass device may include a time delay for establishing a time interval of length t3 corresponding to a minimum length of time between an unclogging operation and a starting up of a new bypass cycle.

According to a further embodiment of the invention, a control device is operated by a pressure-operated switch designed to monitor the caking up of the filters. Alternatively, the control device may be operated by a timer which can be adjusted according to a type of dust to be processed.

According to yet a further embodiment of the invention, a device for controlling a bypass device can also be brought into operation when the installation is started up, for example, for unclogging A bypass cycle, i.e. an opening of the bypass device to exhaust air to the outside atmosphere, may be included for controlling the bypass device. The device may also include a time delay establishing a length of time corresponding to t1+t2 for implementing recycling.

The invention also concerns an installation and in particular an installation in which the bypass device includes two shutters. One shutter controls recycling and the other shutter controls exhausting to the atmosphere, and a device for controlling the shutters.

The above feature presents many advantages such as the possibility, for example, of simultaneously closing the two shutters to offer protection against fire as a ventilation shut-off, and to provide a fire barrier. It also makes it possible to provide an adjustable offset in sequence and in time between the opening and closing of the two shutters at the time of the bypass operation.

According to the invention, the shutters can, for example, include pivoting plates, articulated along a median longitudinal axis, the plates being linked together and controlled simultaneously or independently by an appropriate means.

According to a preferred embodiment, the device for controlling the shutters includes jacks actuated pneumatically. Each jack is controlled by a solenoid valve, a rest position of which corresponds to the closing of the outside atmosphere exhaust shutters and the closing of the air recycling shutters. Alternatively, other devices for actuating the jacks may be utilized.

BRIEF DESCRIPTION OF THE DRAWINGS

The invention will be better understood from the following description and from the attached.

DETAILED DESCRIPTION OF THE PREFERRED EMBODIMENTS

Figure 1:
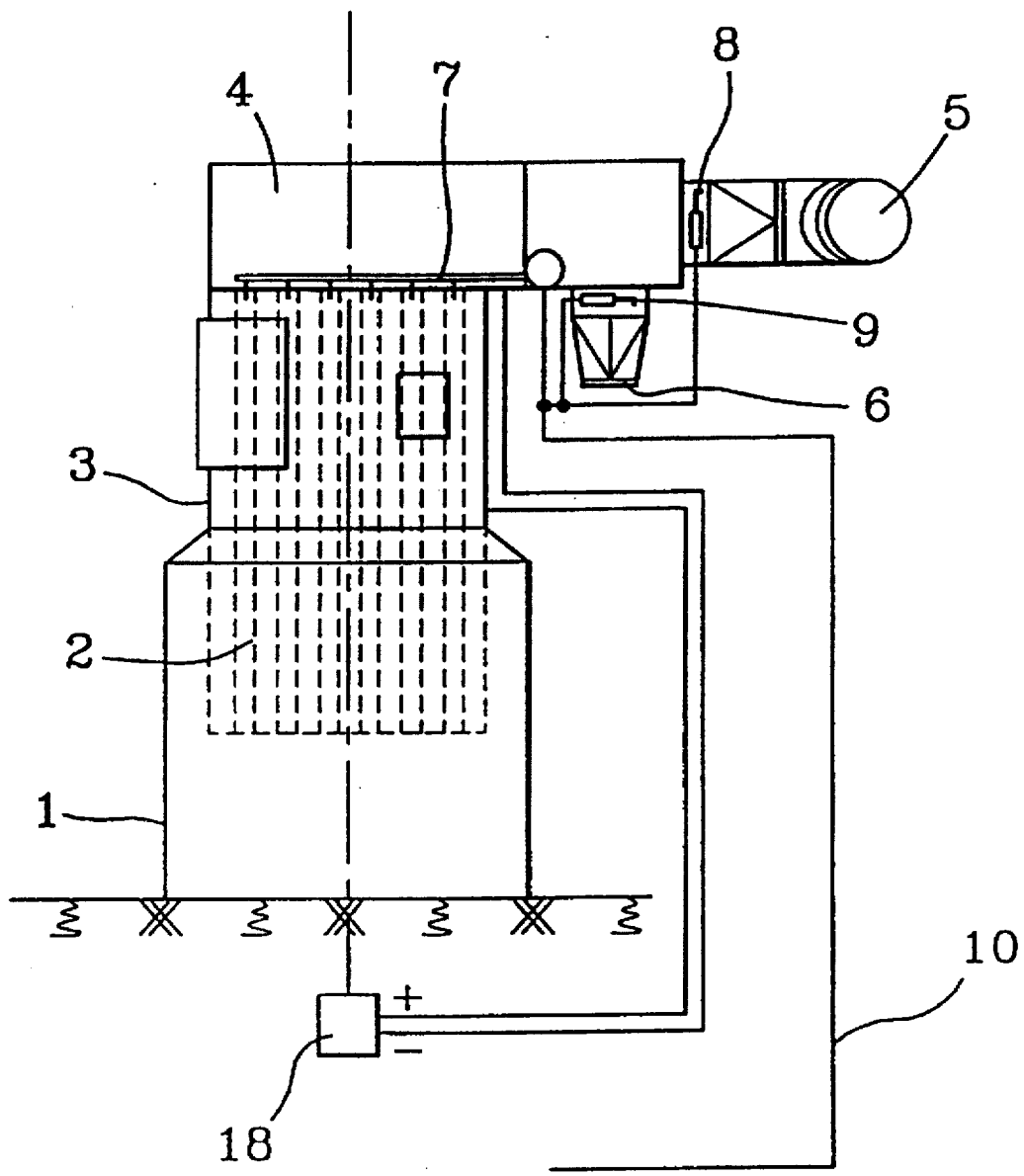
FIG. 1 illustrates a portion of a filtration installation with recycling according to the invention, including a system for automatically unclogging filter sleeves and a bypass device.

The filtration installation shown in FIG. 1 corresponds, in general to an installation of the type described in document FR-A-2 514 669 or above mentioned document EP-A-0 343 061. The present installation comprises, in a conventional way, a cyclonic, or other, lower chamber 1 in which the dust and chips, for example, arrive at high speed carried by an air flow. The air is filtered in filter sleeves 2 mounted in a case 3 positioned above chamber 1. The filtered air escapes from above the case into a hood 4, before being channeled through either a recycling shaft 5 or an exhaust shaft 6.

However, in contrast to other installations described in documents DE-A-2704377 and 2831167 or U.S. Pat. No. 3,383,840, the present installation comprises an automatic unclogging device consisting of one or more booms 7 installed in the hood 4 above the filter sleeves 2. Each unclogging operation includes an injection of compressed air into the filter sleeves 2 causing a kind of counter-flow that unsticks the dust that cakes up on these filter sleeves 2.

The injection of compressed air to unclog the filter sleeves 2 lasts a few tenths of a second. This operation may also cause a small amount of dust to pass through the sleeves when the unclogged sleeves resume their filtration position.

The drawback of releasing dust into the filter sleeves 2 is also found in the prior art documents DE-4-2704377; DE-A-4-2831167; and U.S. Pat. No. 3,383,840.

To avoid reintroducing dust when recycling via shaft 5, it has been suggested to bypass shaft 5 and expel the dust-laden filtered air to the outside atmosphere via shaft 6, as described in above mentioned document FR-A-2 666 246.

Figure 2:
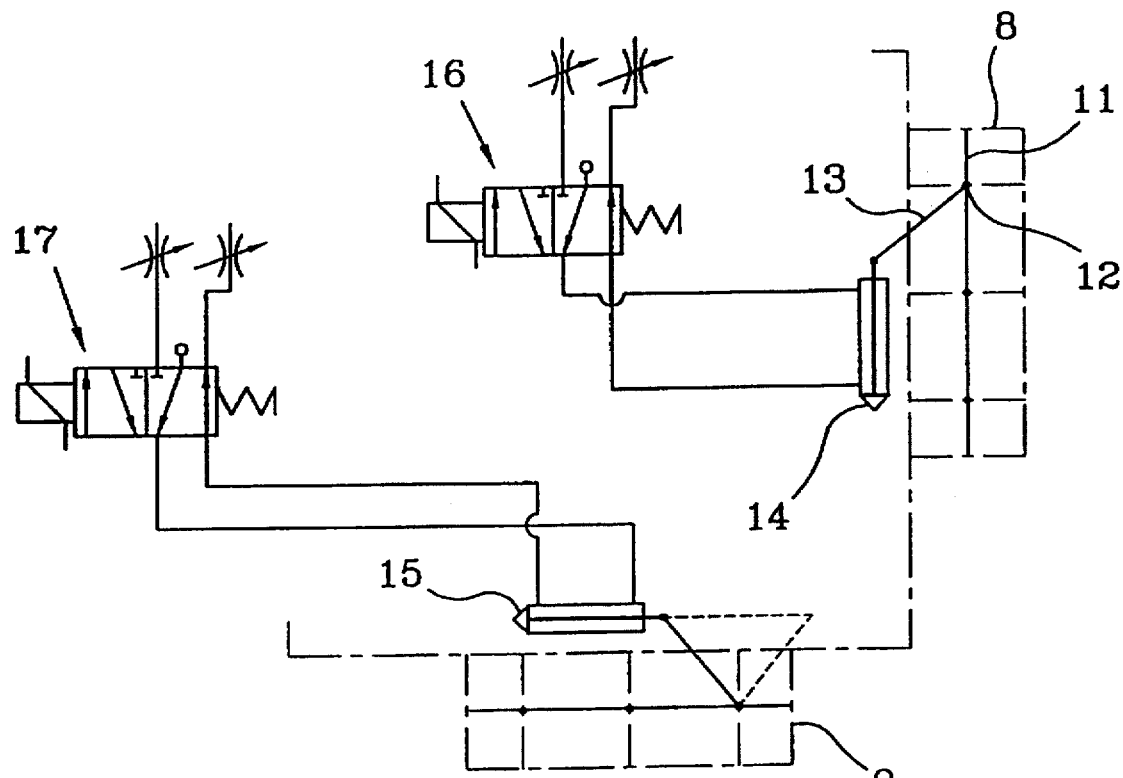
FIG. 2 illustrates a two-shutter device.

However to produce this bypassing in the installation shown in FIGS. 1 and 2, shaft 5 is isolated from hood 4 by device of a shutter 8, referred to as a recycling shutter and the shaft 6 is separated from hood 4 by device of a shutter, referred to as an exhaust shutter 9. These shutters, shown diagrammatically in FIG. 2, can comprise pivoting plates 11, articulated about axes 12 which are arranged longitudinally and in the median plane of plates 11. These shutters are, for example, linked together by a rod (not shown) or any other means, and are actuated simultaneously by device of a crank 13 which is operated by a control system including jacks 14, 15 and solenoid valves 16, 17, respectively. Shutter 8 is operated by the jack 14. Shutter 9 is operated by the jack 15. These jacks 14 and 15 are of the double-action type, actuated, for example, by compressed air from a line 10. These jacks are operated via solenoid valves. Jack 14 is actuated by device of solenoid valve 16. Jack,15 is actuated via solenoid valve 17.

As shown in FIG. 2, these solenoid valves 16 and 17 have a rest position which positions jacks 14 and 15 respectively so as to close shutters 8 and 9. The open position of the lever arm of shutter 9 is also indicated by a light dot-and-dash line.

This open position of shutter 9 or shutter 8 is produced by actuating solenoid valves 17 and 16 respectively.

The unclogging cycle can be triggered whenever the clogging level of filter sleeves 2 reaches an adjustable preset threshold. This threshold can be monitored by device of a pressure-operated switch 18, as shown in FIG. 1, which registers the pressures on the upside and downside of said filter sleeves.

Figure 3:
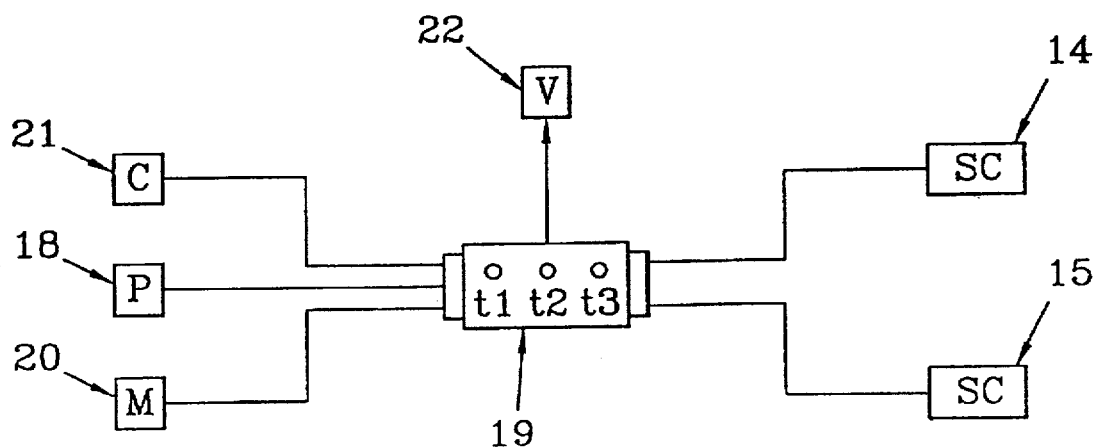
FIG. 3 illustrates a shutter control device.

This pressure-operated switch 18 produces a signal that can be used via a control device 19 integrated or not with the pressure-operated switch (FIG. 3), to produce the opening and/or the closing of shutters 8 and 9. This control device 19 can also receive a signal from a timer 20 for example to trigger the unclogging operations and the opening and/or closing of shutters 8 and 9. This control device 19 can also be used to open and/or close shutters 8 and 9 in line with special needs for example, when the filtration installation is brought into service by switch 21, or when an alarm occurs in the event of a filtration fault. In these cases, the shutter 9 is opened in order to exhaust the air towards the atmosphere because of the possible presence of dust in the filtered air.

This control device 19 also acts on one of the valves or solenoid valves 22 responsible for bringing the unclogging system into service, such as for example at least one of the unclogging booms 7.

Figure 4:
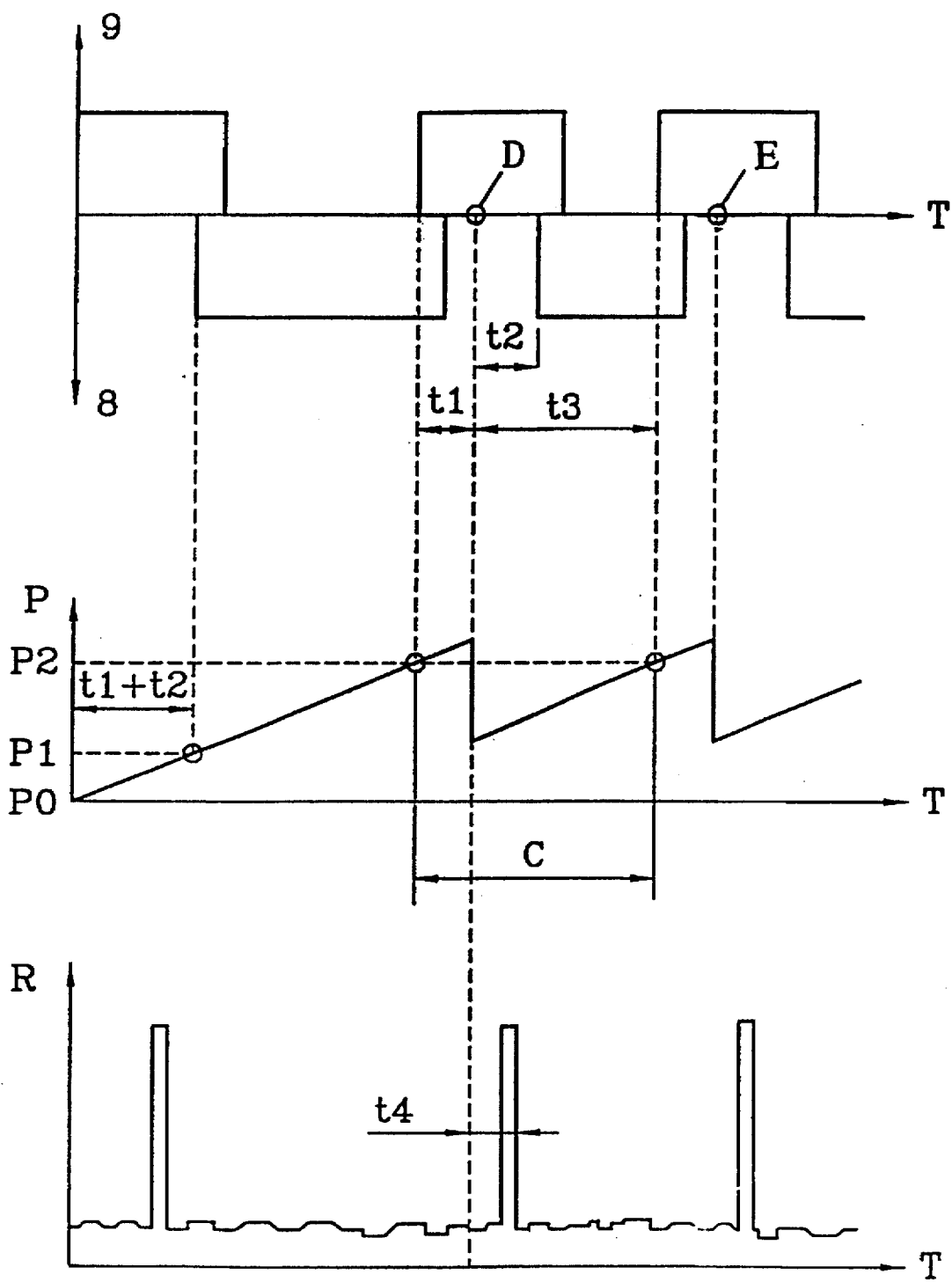
FIG. 4 illustrates three exemplary graphs showing, as a function of time: an expelling and a recycling phase, a pressure registered by a pressure-operated switch, and a dust emission ratio at a time of unclogging.

FIG. 4 shows in graph form, the opening and closing cycles of shutters 9 and 8, that is to say of the exhaust shutter and recycling shutter, as a function of time.

This cycle operates in parallel with the accrual of information recorded by the pressure-operated switch 18 and as a function of time. The cycle also operates in accordance with the dust ratio found in the recycled air.

The origin of these graphs corresponds to a start-up order of the installation. It can be seen that upon issuance of the start-up order, exhaust shutter 9 is opened. That is, the shutter that exhausts filtered air to the outside atmosphere is opened in response to the start-up order. It can be seen that recycle shutter 8 opens before exhaust shutter 9 closes, allowing the recycling of the filtered air.

When the installation starts-up, the pressure-operated switch 18 starts from an initial value P0 and the pressure difference steadily increases to a value P1 in a time t1+t2. Starting from this value P1, the passage of dust through the filter sleeves 2 becomes negligible because of the self-filtration ensured by the clogging of these filter sleeves. Accordingly, when point P1 is reached, the recycling shutter 8 is opened on the order of the control device 19 and exhaust shutter 9 is then closed also on the order of the control device 19.

The pressure difference continues to increase and reaches a threshold P2 which is preset according to the installation and in particular according to the nature or quantity of dust to be filtered. As soon as the threshold P2 is reached, an unclogging is initiated and the pressure-operated switch 18 gives a signal to the control device 19. Control device 19 implements a first time delay of the timer type, so as to establish a length of time t1 until the actual unclogging operation D takes place by activating the unclogging system 22. Before the actual unclogging operation starts, the control device 19 also triggers a cycle which starts by opening the exhaust shutter 9 and then closing the recycling shutter 8.

This length of time t1 is preferably adjustable; for example, from 0 to 3 seconds, to allow the bypass device to move to the corresponding active position.

Simultaneously with the unclogging order, the control device 19 implements a second time delay to establish a length of time t2. This length of time t2 is chosen to guarantee that all residual dust due to the unclogging operation is totally exhausted towards the outside atmosphere. At the end of this length of time t2, the control device 19 establishes a new cycle. The recycling shutter 8 opens at the end of this time delay and, after this opening, exhaust shutter 9 closes.

Time interval t2 is chosen according to the length of time t4 observed on the installation. This length of time t4 corresponds to the time that elapses between activating the unclogging operation and the arrival of the resulting dust at the level of the recycling outlet. This length of time t4 may, for example, be in the order of 2 to 4 seconds for an installation of the type shown in FIG. 1. Because of this, t2 is, for example, in the order of 6 to 10 seconds to ensure that air is recycled after and only after the peak of dust observed in the filtered air.

The unclogging operation also triggers, as shown in FIG. 4, a time delay used to establish a length of time t3 (t3>t2) which corresponds to a minimum time interval before the following unclogging cycle C is started up. This length of time t3 is, for example, in the range 30 seconds to 1 minute.

Time delay t1+t3 corresponds to the minimum space between the unclogging cycles C. Its length is established according to the materials to filter and their quantity.

As shown in FIG. 4, a new unclogging cycle is initiated at the end of the length of time t3 if threshold P2 is reached by pressure-operated switch 18. This threshold triggers the opening and closing cycle of shutters 8 and 9 as well as triggering actual unclogging operation E by action on the unclogging system 22.

Figure 5:
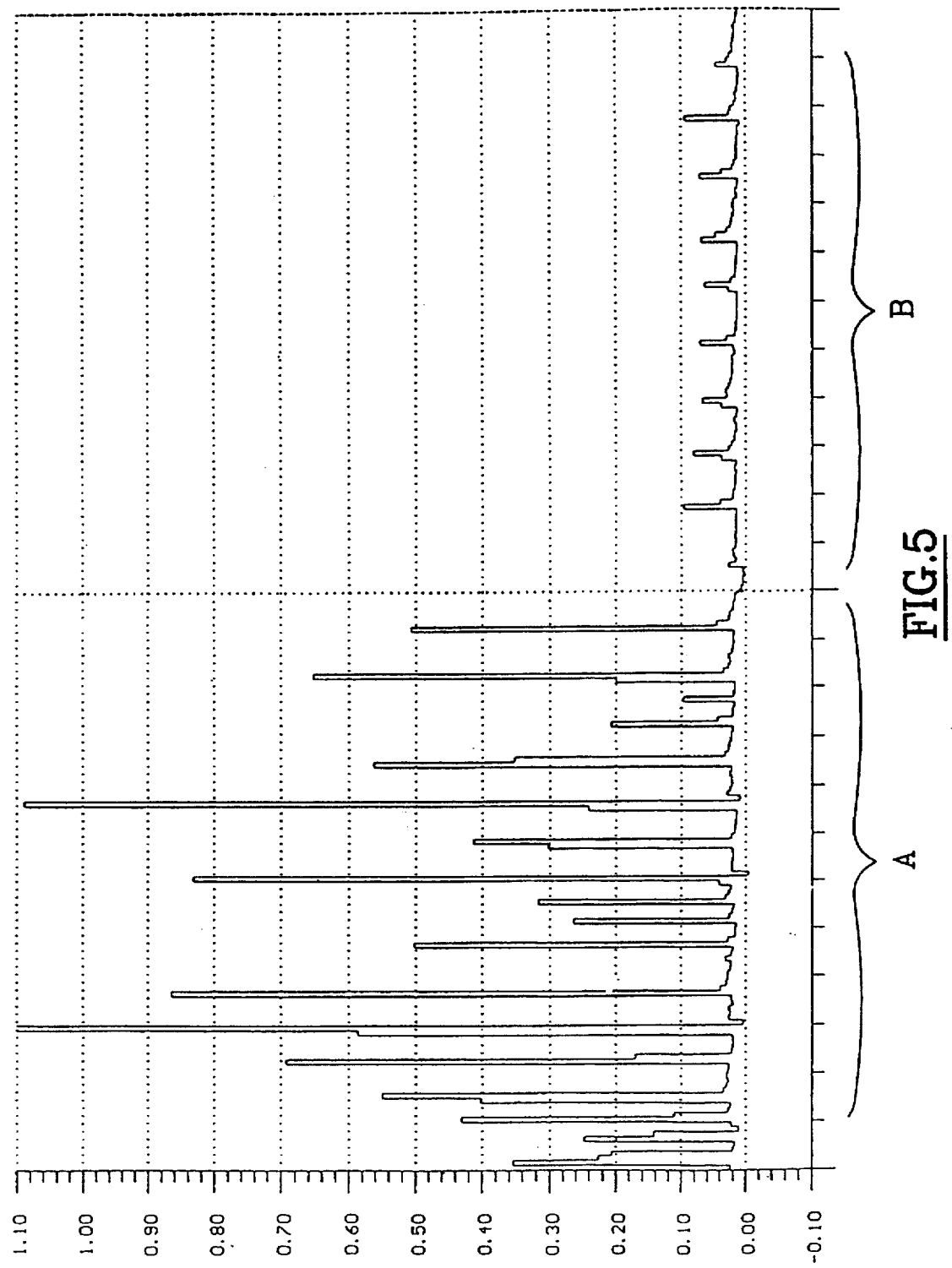
FIG. 5 illustrates a dust emission reading of the recycled air during a first period without use of the bypass system and during a second period with use of the bypass system, the length of each period being approximately an hour.

FIG. 5 shows, for example, a dust emission reading taken in an air at an outlet of the filtration installation. This graph comprises, along the x-axis, time divided into two periods: the first period A corresponds to a dust emission reading taken at the outlet of the filtration installation with, in this period, several unclogging operations of the filter sleeves without the bypass device, i.e., directing the filtered air to the outside atmosphere being brought into service, and the second period B corresponds to a reading during which several unclogging operations of the filter sleeves were also carried out with the bypass device being brought into service.

The graph comprises, along the y-axis, the dust emission indicated in mg/m3.

These dust emission measurements are taken, for example, by a DT770 type machine on the basis of triboelectricity principles.

During the first period A, which is approximately an hour long, a multitude of dust emission peaks can be seen following each filter sleeve unclogging operation.

This type of emission can be observed on all types of prior art installations, whether equipped with an automatic unclogging system using injections of compressed air or injections of filtered air in counter-flow as in the various above mentioned prior art documents.

The period B on the graph, which is also approximately 1 hour long, shows in similar fashion a multitude of peaks of which none exceeds an emission of 0.10 mg of dust per cubic meter of filtered air.

This result is obtained by device of the bypass system according to the present invention which is used at the time of each filter sleeve cleaning operation to bypass the filtered air and exhaust it into the outside atmosphere instead of recycling it.

This reading, taken on the recycled air, shows the large reduction in dust emission obtained by the above mentioned installation.

I claim:

1. An air filtration installation comprising device for unclogging the filtering part, means for recycling air, and means used, at the time of unclogging operations, to bypass the filtered air towards the outside atmosphere, wherein said installation comprises a device for controlling said bypass device and said recycling means, which comprises adjustable time delay means establishing a bypass cycle and an unclogging cycle:

a first time delay to establish a length of time, adjustable from 0 to 3 seconds, which corresponds to the length of time provided between an unclogging order and the unclogging operation, during which time the bypass device are implemented to channel the filtered air towards the outside atmosphere;

a second time delay to establish a length of time run simultaneously with the unclogging operation, following after the first time delay, adjustable from 6 to 10 seconds, and which corresponds to a length of time, at the end of which, said bypass means are again implemented to actuate said recycling means to recycle the filtered air.

2. A filtration installation according to claim 1, wherein the control device comprises a time delay to establish a time interval which corresponds to a minimum length of time chosen according to the materials to filter, the time interval being established between the unclogging operation and the starting up of a new bypass cycle and unclogging cycle.

3. A filtration installation according to claim 1, wherein the control device is activated by device of a pressure-operated switch which monitors caking up of the filtering part.

4. A filtration installation according to claim 1, wherein the control device is activated by device of a timer adjusted according to a material to filter.

5. A filtration installation according to claim 1, wherein the control device is activated by means for bringing the installation into service, the control device activating the bypass meansso as to exhaust the air towards the outside atmosphere for a length of time which corresponds to a time delay equivalent to a sum of the first time delay and the second time delay.

6. A filtration installation according to claim 1, wherein the control system is activated by an alarm in an event of a filtration fault or operating fault, the control device activating the bypass means to exhaust the air towards the outside atmosphere.

7. A filtration installation according to claim 1, wherein the bypass means comprising two shutters: a shutter to control recycling and a shutter to control exhaustion towards the outside atmosphere, and means for controlling said shutters, consisting of jacks and solenoid valves.

8. A filtration installation according to claim 7, wherein each control system has a rest position which corresponds to the closing of the outside atmosphere exhaust shutters and of the filtered air recycling shutters.

9. An air filtration installation comprising:

a device for unclogging a filter part, said unclogging device actuated by an unclogging order;

a device for recycling filtered air;

a device for expelling filtered air to an outside atmosphere;

a device for selectively bypassing one of said recycling device and said expelling device;

said selective bypass device bypassing said recycling device prior to actuation of an unclogging operation and bypassing said expelling device after actuation of said recycling device; and said selective bypass device actuating said recycling device and said expelling device.

10. The air filtration installation according to claim 9, said bypassing device comprising an adjustable time delay establishing a bypass cycle including a first time delay having a first length of time corresponding to a time period between said unclogging order and said actuation of said unclogging device, and a second time delay for having a second length of time sufficient to exhaust unclogged residue.

11. The air filtration installation according to claim 10, said bypass device actuating said expelling device when said unclogging order is issued;

said bypass device bypassing said recycling device during said first time delay;

said bypass device actuating said recycling device at the end of said second time delay.

12. The air filtration installation according to claim 9, further comprising a pressure operated switch coupled to said bypass device for monitoring a pressure within said installation.

13. The air filtration installation according to claim 12, said pressure operated switch issuing said unclogging order when said pressure attains a predetermined value.

14. The air filtration installation according to claim 9, said bypassing device comprising a plurality of shutters.

15. The air filtration installation according to claim 14, said plurality of shutters being actuated by a plurality of cranks, each said crank including a jack and a solenoid valve.

16. The air filtration installation according to claim 9, said unclogging device comprising a plurality of unclogging booms for freeing residue trapped in a plurality of filter sleeves.

17. The air filtration installation according to claim 16, said bypassing device directing said freed residue to said expelling device.

* * * * *